US 7,652,087 B2
Jan. 26, 2010

(12) United States Patent
Dimanshteyn et al.

(10) Patent No.: US 7,652,087 B2
(45) Date of Patent: Jan. 26, 2010

(54) PROTECTIVE COATING (75) Inventors: Felix A. Dimanshteyn, West Hartford, CT (US); Richard J. Barone, Wilton, CT (US)

(73) Assignee: American Thermal Holdings Company, Saunderstown, RI (US)

(*) Notice: Subject to any disclaimer, the term of this patent is extended or adjusted under 35 U.S.C. 154(b) by 256 days.

(21) Appl. No.: 11/359,336

(22) Filed: Feb. 21, 2006

(65) Prior Publication Data

US 2007/0197686 A1 Aug. 23, 2007

(51) Int. Cl.
  *C08K 3/10* (2006.01)
  *C08K 3/18* (2006.01)
  *C08K 3/34* (2006.01)
  *C08K 9/04* (2006.01)

(52) U.S. Cl. .................. 524/430; 524/437; 524/445; 524/447; 524/493; 523/179

(58) Field of Classification Search .............. 523/179; 524/430, 437, 445, 447, 493
See application file for complete search history.

(56) References Cited

U.S. PATENT DOCUMENTS

| | | | |
|---|---|---|---|
| 2,452,054 A | 10/1948 | Jones et al. | |
| 2,452,055 A | 10/1948 | Jones et al. | |
| 2,523,626 A | 9/1950 | Jones et al. | |
| 2,566,964 A | 9/1951 | Scholz et al. | |
| 2,600,455 A | 6/1952 | Wilson et al. | |
| 2,684,953 A | 7/1954 | Stilbert, Jr. et al. | |
| 2,755,260 A | 7/1956 | Stilbert, Jr. et al. | |
| 3,021,293 A | 2/1962 | Simon | |
| 3,062,792 A | 11/1962 | McConnell et al. | |
| 3,422,046 A | 1/1969 | Thomas et al. | |
| 3,448,075 A | 6/1969 | Clark et al. | |
| 3,955,987 A | 5/1976 | Schaar et al. | |
| 3,983,186 A | 9/1976 | Eilers et al. | |
| 3,983,296 A | 9/1976 | Purvis et al. | |
| 3,993,607 A | 11/1976 | Florence | |
| 4,017,657 A | 4/1977 | Foley et al. | |
| 4,042,556 A | 8/1977 | Yoshinaga | |
| 4,065,394 A | 12/1977 | Pratt et al. | |
| 4,110,062 A | 8/1978 | Summers | |
| 4,120,833 A | 10/1978 | Purvis et al. | |
| 4,144,385 A | 3/1979 | Downing et al. | |
| 4,322,170 A | 3/1982 | Papenmeier | |
| 4,341,694 A | 7/1982 | Halpern | |
| 4,444,969 A | 4/1984 | Younes | |
| 4,612,239 A | 9/1986 | Dimanshteyn | |
| 4,871,477 A | 10/1989 | Dimanshteyn | |
| 5,000,900 A | 3/1991 | Baumgartner | |
| 5,035,951 A | 7/1991 | Dimanshteyn | |
| 5,091,243 A | 2/1992 | Tolbert et al. | |
| 5,204,393 A | 4/1993 | Nalepa et al. | |
| 5,225,464 A | 7/1993 | Hill, Jr. | |
| 5,324,461 A | 6/1994 | Grohman | |
| 5,391,585 A | 2/1995 | Grohman | |
| 5,532,292 A * | 7/1996 | Wainwright et al. | 523/179 |
| 5,552,484 A | 9/1996 | Enomoto | |
| 5,603,990 A | 2/1997 | McGinniss et al. | |
| 5,686,025 A | 11/1997 | Martin | |
| 5,728,337 A | 3/1998 | Yoshikawa et al. | |
| 5,759,692 A | 6/1998 | Scholz et al. | |
| 5,783,613 A | 7/1998 | Beekman et al. | |
| 5,786,399 A | 7/1998 | Beekman et al. | |
| 5,865,003 A | 2/1999 | Klett et al. | |
| 5,935,879 A | 8/1999 | Helwig et al. | |
| 6,059,440 A | 5/2000 | Fuchs | |
| 6,093,485 A | 7/2000 | Jaffee | |
| 6,153,674 A * | 11/2000 | Landin | 524/35 |
| 6,179,460 B1 | 1/2001 | Burkhardt et al. | |
| 6,225,365 B1 | 5/2001 | Zerafati et al. | |
| 6,316,118 B1 | 11/2001 | Watanabe et al. | |
| 6,350,400 B1 | 2/2002 | Piotrowski | |
| 6,369,153 B1 * | 4/2002 | Guerin et al. | 524/523 |
| 6,503,425 B1 | 1/2003 | Thorbjörnsson et al. | |
| 6,548,155 B1 | 4/2003 | Jaffee | |
| 6,564,437 B2 | 5/2003 | Meng et al. | |
| 6,609,819 B2 | 8/2003 | Hauck et al. | |
| 6,613,391 B1 | 9/2003 | Gang | |
| 6,632,442 B1 | 10/2003 | Chyall et al. | |
| 6,688,217 B2 | 2/2004 | Hauck et al. | |
| 6,706,793 B2 | 3/2004 | Abu-Isa et al. | |
| 6,706,820 B2 | 3/2004 | Kumaki et al. | |

(Continued)

FOREIGN PATENT DOCUMENTS

BE 669341 3/1966

(Continued)

OTHER PUBLICATIONS

M. Buganjy et al., The Origin and Nature of Flame Retardance in Ethylene-Vinyl Acetate Copolymers Containing Hostaflam AP 750, Polymer Int'l, 48, 264-270, 1999.

(Continued)

*Primary Examiner*—Kriellion A Sanders
(74) *Attorney, Agent, or Firm*—Weitzman Law Offices, LLC (57) ABSTRACT

Fire-protective coatings comprising a water-soluble alkali metal silicate binder, at least one inorganic particulate material which endothermically releases a nonflammable gas in the presence of heat, and an inorganic filler and/or a polymeric binder are disclosed.

25 Claims, 1 Drawing Sheet (1 of 1 Drawing Sheet(s) Filed in Color)

U.S. PATENT DOCUMENTS

| | | | |
|---|---|---|---|
| 6,743,742 | B1 | 6/2004 | LaRocco et al. |
| 6,790,893 | B2 | 9/2004 | Nguyen et al. |
| 2006/0241232 | A1* | 10/2006 | Garces et al. ............... 524/444 |

FOREIGN PATENT DOCUMENTS

| | | |
|---|---|---|
| EP | 0735119 | 10/1996 |
| GB | 874762 | 8/1961 |
| GB | 978623 | 12/1964 |
| GB | 1217041 | 12/1970 |
| JP | 5278 | 1/1977 |

OTHER PUBLICATIONS

SK Dey et al, Inert Gas Extrusion of rigid PVC Foam, J. of Vinyl and Additive Technology, Mar. 1996, vol. 2. No. 1.

CJ Hilado, Flammability Handbook for Plastics, Technomis, Stamford, CT 1969.

Lyons, The Chemistry & Uses of Fire-Retardants, Wiley & Sons, 1970, Chap. 7, pp. 297-301.

PVC in Fires, The British PLastics Federation, London, Apr. 1996.

C. Rauwendaal, "Polymer Extrusion", Hanser Publishers, NY 1986.

Scharf et al., Studies on Flame Retardant Intumescent Char: Part I, Fire Safety Journal 19, pp. 103-117.

MJ Stevens, Extruder Principals and OPeration, Elseviwer Applied Science Publishers, NY 1985.

"Surface Burning Characteristics of Building Materials", ASTM Fire Standards, 6th Edition, ASTM International, Oct. 1, 2004 and Annual Book of ASTM Standards, vol. 04.07, Nov. 2004.

JL White, Twin Screw extrusion, Technology and Principles, Hanser Publishers, NY 1991.

* cited by examiner

Fig. 1

PROTECTIVE COATING

FIELD OF INVENTION

The invention relates generally to coatings for protecting flammable substrates against heat and flame.

BACKGROUND OF THE INVENTION

Numerous approaches have been developed to protect flammable substrates from fire. One approach that has found widespread utility is the application of fire-retardant coatings to the substrate. Fire-protective coatings may be broadly classified as ceramic-based coatings, ablative coatings, intumescent coatings, and vapor-producing (sublimation) coatings, although in practice there may be substantial overlap of the chemical and physical fire-retarding mechanism between these approaches Some conventional flame-retardant coatings employ so-called intumescent materials. These are materials that react in the presence of heat or flame to produce incombustible residues ("char") which expand to a cellular foam having good insulation properties. Generally, intumescent materials comprise a carbonific material, typically a polyhydridic substance, such as a sugar or polyol, and an intumescent catalyst which is a dehydrating agent, such as phosphoric acid, usually introduced as a salt or ester. Upon heating, the acid is believed to catalyze the dehydration of the polyol to polyofefinic compounds which are subsequently converted to carbon char. "Blowing agents" which release nonflammable gases upon heating may be used to facilitate formation of the cellular foam.

Despite the effectiveness of intumescent coatings in protecting flammable substrates, there are certain disadvantages associated with their use. For example, the intumescent reaction can produce large bubbles in the coating which, upon rupture, may expose the underlying substrate. Such localized regions of exposed substrate are thereby rendered unprotected and may provide sites at which combustion of the substrate can occur.

Despite the advances in protective surface coatings, there remains a need for coatings which overcome some or all of these disadvantages.

It is accordingly an objective of the present invention to provide coatings which protect a substrate against heat or flame when used alone or in combination with one or more additional coating layers, including for example, intumescent coatings, fire-retardant coatings, and water-resistant coatings.

It is a further objective of the present invention to provide latex paints which protect a substrate against heat or flame.

SUMMARY OF THE INVENTION

In accordance with the foregoing objectives and others, the present invention provides non-flammable or substantially non-flammable and smoke-free or substantially smoke-free coating compositions having a water-soluble alkali metal silicate binder and at least one inorganic particulate material which endothermically releases a nonflammable gas in the presence of heat. In various embodiments of the invention, the compositions will further comprise additional ingredients to modify one or more properties of the composition.

In one variant of the claimed invention, coating compositions are provided having (a) a water-soluble alkali metal silicate binder; (b) at least one inorganic particulate material which endothermically releases a nonflammable gas in the presence of heat; and (c) a polymeric binder. The polymeric binder imparts flexibility and ductility to the coating and serves to prevent checking and cracking when applied to flexible substrates such as pipes, tubing, cabling and the like. The polymeric binder further serves to improve the water-resistance of the coating.

In another variant of the claimed invention, coating compositions are provided having (a) a water-soluble alkali metal silicate binder; (b) at least one inorganic particulate material which endothermically releases a nonflammable gas in the presence of heat; and (c) an inorganic filler; with the proviso that the inorganic filler is not a hydrated metal silicate clay. It will be understood that this proviso is intended to apply only to this specific embodiment. In other embodiments described herein, there is no limitation on the selection of inorganic filler.

In yet another variant of the claimed invention, coating compositions are provided having (a) a water-soluble alkali metal silicate binder; (b) at least one inorganic particulate material which endothermically releases a nonflammable gas in the presence of heat; (c) an inorganic filler; and (d) a polymeric binder to impart flexibility and water-resistance to the coating.

The coating compositions may be provided in the form of an aqueous solution or suspension of any of the foregoing compositions which can be applied to a substrate by brushing, spraying, rolling and the like. In one interesting implementation, aqueous solutions or dispersions are provided having: (a) an alkali metal silicate binder; (b) at least one inorganic particulate material which endothermically releases a non-flammable gas when exposed to heat or flame; (c) an inorganic filler; and (d) a polymeric binder. In another variant according to this aspect, coating compositions are provided in the form of aqueous solutions or dispersions comprising sodium silicate, alumina trihydrate, kaolin, and a latex polymeric binder.

The coatings can be applied directly to a substrate to provide a non-flammable or substantially non-flammable and smoke-free or substantially smoke-free barrier. However, interesting advantages are realized when the coatings are employed in conjunction with one or more other coating materials.

The coatings may be applied as an overcoat to another coating, such as an intumescent coating. When so used, the coating serves to limit overexpansion of the underlying intumescent layer. Therefore, the invention provides a fire-retardant coating comprising a first coating which is capable of intumescing in the presence of heat or flame and a second coating disposed either directly on the first coating or on one or more coatings intermediately disposed between the first and second coatings. The second coating may be any of the non-flammable or substantially non-flammable and smoke-free or substantially smoke-free barrier coatings described herein.

One example variant incorporating the invention as claimed involves providing a coating having:
  (a) a first coating which is capable of intumescing in the presence of heat or flame; and
  (b) a second coating comprising:
    (i) a water-soluble alkali metal silicate binder;
    (ii) at least one inorganic particulate material which endothermically releases a nonflammable gas when exposed to heat or flame;
    (iii) an inorganic filler; and
    (iv) a polymeric binder;

wherein the second coating is disposed either directly on the first coating or on one or more coatings intermediately disposed between the first and second coatings.

With another example variant incorporating the invention as claimed, the inventive coatings may be employed as one layer in a multi-layer coating "system," which includes, for example, one or more under-coatings, including without limitation an intumescent coating, and/or one or more over-coatings, including without limitation a fire-retardant coating that is substantially resistant to water. In one such embodiment, the coating system would involve:

(a) a first coating which is capable of intumescing in the presence of heat or flame; and
(b) a second coating comprising:
   (i) a water-soluble alkali metal silicate binder;
   (ii) at least one inorganic particulate material which endothermically releases a nonflammable gas when exposed to heat or flame;
   (iii) an inorganic filler; and
   (iv) a polymeric binder;
(c) a third coating which is substantially resistant to water comprising a water-insoluble polymeric binder and an inorganic fire-retardant;

wherein, the second coating is disposed either directly on the first coating or on one or more coatings intermediately disposed between the first and second coatings and wherein the third coating is disposed either directly on the second coating or on one or more coatings intermediately disposed between the second and third coatings.

It will be understood, however, that the compositions of the invention provide effective non-flammable or substantially non-flammable and smoke-free or substantially smoke-free barrier coatings when used alone on a substrate (i.e., in the absence of an undercoating or overcoating). For example, a variety of flammable building materials may be converted to Class A or Class B building material by application of a coating comprising the compositions of the invention. Accordingly, the invention also provides fire-protected materials comprising flammable substrates having affixed thereto the inventive coating compositions.

In yet another example variant incorporating the invention, non-flammable or substantially non-flammable and smoke-free or substantially smoke-free paints are provided that involve: (a) a water-soluble alkali metal silicate binder; (b) at least one inorganic particulate material which endothermically releases a nonflammable gas in the presence of heat; (c) an inorganic filler; (d) an elastomeric binder, such as latex; and (e) one or more pigments.

The advantages and features described herein are a few of the many advantages and features available from representative examples and variants and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. In addition, different permutations and combinations beyond those expressly set forth should be understood to exist and can be created based upon the description provided herein without exhaustive recitation. Thus, this summary of features and advantages should not be considered dispositive in determining equivalence. Additional features and advantages of the invention will become apparent in the following description and from the claims.

BRIEF DESCRIPTION OF THE DRAWINGS

The patent or application file contains at least one drawing executed in color. Copies of this patent or patent application publication with color drawings will be provided by the Patent and Trademark Office upon request and payment of the necessary fee.

DETAILED DESCRIPTION

As used herein, all terms are intended to have their ordinary meaning in the art unless specifically defined. The terms "non-flammable" and "smoke-free" refer to materials which pass ASTM E84-04 with a flame spread index of 0 and a smoke index of 0, respectively. The terms "substantially non-flammable" and "substantially smoke-free" refer to materials which achieve a Class A or Class B, preferably Class A, rating under ASTM E84-04.

i. Coating Compositions

The coating compositions of the invention comprise a water-soluble alkali metal silicate binder and at least one inorganic particulate material which endothermically releases a nonflammable gas when exposed to heat or flame. In various embodiments, the coating compositions further comprise an inorganic filler for increasing thermal stability and resistance of said composition to wear and/or a polymeric binder. The compositions may be formulated as non-flammable and/or smoke-free and/or substantially non-flammable and/or substantially smoke-free coatings which provide protection to an underlying substrate against damage from heat or fire. The polymeric binders are incorporated into the coatings with or without the presence of a plasticizer, which may optionally be added to adjust the flexibility and ductility of the coating.

The coating compositions include an alkali metal silicate binder. The alkali metal silicate binder holds together the various components in the protective coating. In the broadest aspect of the invention, it is contemplated that any alkali metal silicate binder may be employed, such as sodium and potassium silicates.

As used herein, the term "alkali metal silicate binder" refers to any silicate comprising, in any relative proportions, $M_2O$ and $SiO_2$ wherein "M" represents an alkali metal, including lithium, sodium, and potassium, and combinations thereof. Alkali metal silicate binders include, but are not limited to, sodium silicates, potassium silicates, and lithium silicates, and combinations thereof. As used herein, the term "sodium silicate" is used expansively to include any silicate comprising $Na_2O$ and $SiO_2$ in any ratio, including without limitation, sodium orthosilicate ($Na_4SiO_4$), sodium metasilicate ($Na_2SiO_3$), sodium disilicate ($Na_2Si_2O_5$), sodium tetrasilicate ($Na_2Si_4O_9$), sodium polysilicate ($Na_2SiO_3)_n$, sodium pyrosilicate ($Na_6Si_2O_7$) and the like. Typically, but not necessarily, useful sodium silicates will have a ratio of $Na_2O$ to $SiO_2$ of about 1:4 to about 2:1. The sodium silicates will typically have a melting point above about 800° C. depending on grade.

The term "potassium silicate" is used expansively to include any silicate comprising $K_2O$ and $SiO_2$ in any ratio including all variable compositions between and including $K_2Si_2O_5$ to $K_2Si_3O_7$. In some, but not all, embodiments the potassium silicate will be of the form $K_2O.nSiO_2$ where "n" is between about 2.5 and about 4.0 in order to maximize the film-forming properties and stability of the binder.

Lithium silicates of the general form $Li_2O \cdot nSiO_2$, including those where "n" is between about 3 and about 8, are also contemplated to be useful. Mixed water soluble alkali metal silicates, such as potassium sodium silicate, of the general formula $K_2O \cdot Na_2O \cdot SiO_2$, are also contemplated to be useful.

Special mention may be made of water-soluble sodium silicate binders. In some embodiments of the invention, the water-soluble sodium silicate binder is provided as an aqueous solution or dispersion comprising from about 30 to 60% by weight sodium silicate (CAS# 1344-09-8). Typically, the sodium silicate according to this embodiment will have one or more of the following characteristics: a $SiO_2:Na_2O$ weight ratio of about 1.60:1 to about 3.25:1, a viscosity between about 50 and about 70,000 centipoises ("cps"), more typically between about 50 and about 1,000 cps at 68° F. (20° C.), a pH between about 11 and about 14, and/or a density (specific gravity) of about 1.35 to 1.70 g/cm³ at 68° F. (20° C.). The characteristics of aqueous sodium silicate binder solutions (e.g., viscosity, specific gravity, density, etc.) largely depend upon the total solids content of the solution as well as the $SiO_2:Na_2O$ ratio. It is within the skill in the art to vary these parameters to provide sodium silicate solutions having any desired property, including properties within the ranges described above.

Suitable water-soluble sodium silicate binders include "N®" sodium silicate sold by the PQ Corporation (Berwyn, Pa.), also referred to as "waterglass." N® sodium silicate is supplied as a viscous liquid comprising about 62.5% water and about 37.5% sodium silicate having an $SiO_2:Na_2O$ weight ratio of 3.22:1. N® sodium silicate has a density at 68° F. (20° C.) of 1.38 g/cm³, a viscosity of 180 cps, and a pH of 11.3. Other commercial grades of sodium silicate binder solutions available from the PQ Corporation which are contemplated to be useful in the practice of the invention include, but are not limited to, E™ sodium silicate which comprises about 63.7% water and about 36.3% sodium silicate by weight with an $SiO_2:Na_2O$ weight ratio of 3.22 (viscosity 100 cps, density 11.5 lb/gal, 1.37 g/cm³, all at 68° F.); K® sodium silicate comprising about 57.3% water and about 42.7% sodium silicate by weight with an $SiO_2:Na_2O$ weight ratio of 2.88 (viscosity 960 cps, density 12.3 lb/gal, 1.47 g/cm³, all at 68° F.); M® sodium silicate comprised of about 55.4% water and about 44.6% sodium silicate by weight with an $SiO_2:Na_2O$ weight ratio of 2.58 (viscosity 780 cps, density 12.6 lb/gal, 1.50 g/cm³, all at 68° F.); N® 38 sodium silicate comprised of about 65.4% water and about 34.6% sodium silicate by weight with an $SiO_2:Na_2O$ weight ratio of 3.22 (viscosity 60 cps, density 11.3 lb/gal, 1.36 g/cm³, all at 68° F.); O® sodium silicate comprised of about 61.4% water and about 38.6% sodium silicate by weight with an $SiO_2:Na_2O$ weight ratio of 3.22 (viscosity 400 cps, density 11.8 lb/gal, 1.41 g/cm³, all at 68° F.); OW™ sodium silicate comprised of about 61.4% water and about 38.6% sodium silicate by weight with an $SiO_2:Na_2O$ weight ratio of 3.22 (viscosity 400 cps, specific gravity 42.2° Baume', all at 68° F.); RU™ sodium silicate comprised of about 52.9% water and about 47.1% sodium silicate by weight with an $SiO_2:Na_2O$ weight ratio of 3.22 (viscosity 2,100 cps, density 13.0 lb/gal, 1.56 g/cm³, all at 68° F.); and V™ sodium silicate comprising about 62.9% water and about 37.1% sodium silicate by weight with an $SiO_2:Na_2O$ weight ratio of 2.5 (viscosity 60 cps, density 11.7 lb/gal, 1.40 g/cm³, all at 68° F.).

Other suitable sodium silicate binders include, for example, those available from Occidental Chemical Corporation (Dallas, Tex.) under the name "OxyChem®", including but not limited to, OxyChem® Grade 40 which comprises about 61.7% water and about 38.3% sodium silicate by weight with an $SiO_2:Na_2O$ weight ratio of 3.22 (viscosity 205 cps, specific gravity 1.401, density 11.67 lb/gal, all at 68° F.); OxyChem® Grade 42 which comprises about 60.7% water and about 39.3% sodium silicate by weight with an $SiO_2:Na_2O$ weight ratio of 3.22 (viscosity 400 cps, specific gravity 1.415, density 11.79 lb/gal, all at 68° F.); OxyChem® Grade JW-25 which comprises about 62.6% water and about 37.4% sodium silicate by weight with an $SiO_2:Na_2O$ weight ratio of 2.54 (viscosity 63 cps, specific gravity 1.407, density 11.73 lb/gal, all at 68° F.); OxyChem® Grade 50 which comprises about 55.93% water and about 44.07% sodium silicate by weight with an $SiO_2:Na_2O$ weight ratio of 2.00 (viscosity 335 cps, specific gravity 1.526, density 12.71 lb/gal, all at 68° F.); and OxyChem® Grade 52 which comprises about 52.75% water and about 47.25% sodium silicate by weight with an $SiO_2:Na_2O$ weight ratio of 2.40 (viscosity 1,790 cps, specific gravity 1.559, density 12.98 lb/gal, all at 68° F.).

Water-soluble potassium silicate binders are also contemplated to be useful in the practice of the invention. In some embodiments of the invention, the water-soluble potassium silicate binder is provided as an aqueous solution or dispersion comprising from about 20 to 50% by weight potassium silicate, or more typically bout 30 to about 40% by weight potassium silicate. Typically, the potassium silicate according to this embodiment will have one or more of the following characteristics: a $SiO_2:K_2O$ weight ratio of about 1.40:1 to about 2.5:1, a viscosity between about 40 and about 70,000 centipoises ("cps"), more typically between about 40 and about 1,000 cps at 68° F.(20° C.), a pH between about 11 and about 14, and/or a density (specific gravity) of about 1.25 to 1.50 g/cm³ at 68° F.(20° C.). It will be observed that solutions of potassium silicates are frequently more viscous than solutions of sodium silicate on an equal total solid contents basis. The characteristics of aqueous potassium silicate binder solutions (e.g., viscosity, specific gravity, density, etc.) largely depend upon the total solids content of the solution as well as the $SiO_2:K_2O$ ratio. It is within the skill in the art to vary these parameters to provide potassium silicate solutions having any desired property, including properties within the ranges described above.

Potassium silicate binder solutions contemplated to be useful in the practice of the invention include, but are not limited to, those available from the PQ Corporation under the name "Kasil®" including, for example, Kasil® 1 potassium silicate which is a clear liquid comprising about 70.9% water and about 29.1% potassium silicate by weight with an $SiO_2:K_2O$ weight ratio of 2.5 and molar ratio of 3.92 (viscosity 40 cps, density 10.5 lb/gal, 1.26 g/cm³, pH 11.3 all at 68° F.); Kasil® 33 potassium silicate which is a clear liquid comprising about 64.0% water and about 36.0% potassium silicate by weight with an $SiO_2:K_2O$ weight ratio of 2.1 and molar ratio of 3.29 (viscosity 44 cps, density 11.2 lb/gal, 1.34 g/cm³, pH 11.7 all at 68° F); Kasil® 6 potassium silicate which is a clear liquid comprising about 60.85% water and about 39.15% potassium silicate by weight with an $SiO_2:K_2O$ weight ratio of 2.1 and molar ratio of 3.29 (viscosity 1,050 cps, density 11.6 lb/gal, 1.38 g/cm³, pH 11.7 all at 68° F.).

With regard to lithium silicates, particular mention may be made of the lithium polysilicate sold under the product name Polysilicate 48 (DuPont, Wilmington, DE) which is a clear liquid comprising about 78% water, about 20% lithium silicate (CAS# 12627-14-4), and about 2% lithium hydroxide (CAS# 1310-65-2) by weight and having an $SiO2:Li2O$ molar ratio of about 4.2: 1, a pH of 11, and specific gravity of 1.18.

It may be desirable to employ combinations of any of the foregoing alkali metal silicates, including for example, combinations or sodium, potassium, and lithium silicates, and combinations of different silicate grades such as a combination of a high viscosity and low viscosity silicate. The alkali metal silicates may also be mixed with other silicates, such as, for example, ammonium silicate.

The compositions of the invention also comprise an inorganic particulate material which endothermically releases non-flammable gas in the presence of heat or flame. In the broadest aspects of the invention, any such inorganic particulate material may be employed. Crystalline materials having water of hydration are one interesting example of endothermic inorganic fire-retardants. Suitable inorganic materials comprising water of hydration include, for example, crystalline oxides such as alumina trihydrate, hydrated magnesium oxide, and hydrated zinc borate, including but not limited to $2ZnO.3B_2O_3.3\frac{1}{2}H_2O$, $4ZnO.B_2O_3.H_2O$, $4ZnO.6B_2O_3.7H_2O$, and $2ZnO.2B_2O_3.3H_2O$. It will be understood that the term "oxide," as used herein, refers to inorganic substances comprising at least one atom which forms at least one double bond to oxygen, and includes substances having one atom double bonded to oxygen, for example MgO, and substances having two or more atoms double bonded to oxygen, for example zinc borate.

In one embodiment, the inventive coatings may be substantially non-intumscent, meaning that the expansion of the coating upon exposure to heat or flame is less than about 300%. In this embodiment only, it is necessary to employ an inorganic particulate material which does not, either by itself or in concert with other components of the coatings, cause substantial intumescence in the presence of heat or flame. In selecting the inorganic particulate material according to this embodiment, the skilled artisan will therefore be guided by the criteria that the inorganic particulate material should be at least one of the following: (1) not capable of participating in an intumescent reaction; (2) non-intumescent or substantially non-intumescent when employed in combination with the other components of the coating; or (3) non-intumescent or substantially non-intumescent at the particular levels in which it is present in the coating. In this regard, it has been found disadvantageous to employ borax ($Na_2B_4O_7.H_2O$) as the inorganic fire retardant when formulating coatings according to this embodiment.

In one embodiment of the invention the inorganic particulate material is alumina trihydrate. Alumina trihydrate ("ATH") is an inorganic flame retardant defined by the chemical formula $Al_2O_3.3H_2O$. In the presence of heat from fire, ATH endothermically releases its water of hydration which comprises 35% of the molecular weight of ATH. The endothermic reaction helps to cool the substrate below its flash point. The liberated water also provides a vapor barrier which shields the substrate from oxygen needed for combustion.

The commercially available alumina trihydrate powder MICRAL® 932 (J. M. Huber Corp., Edison, N.J.) has been found useful. MICRAL® 932 is a high surface area ultrafine alumina trihydrate having a typical chemical analysis of $Al_2O_3$ (64.9%), $SiO_2$ (0.005%), $Fe_2O_3$ (0.007%), total $Na_2O$ (0.3%), soluble $Na_2O$ (0.12%), 34.6% loss on ignition (550° C.), and 0.8% free moisture (105° C.). MICRAL® 932 is characterized by a median particle diameter of 2 microns, 100% passage through a 325 mesh sieve, and a surface area of 13 $m^2$/gm as measured with a Quantachrome monosorb surface area analyzer. Another suitable alumina trihydrate that is commercially available is Onyx Elite® 100 (J.M. Huber Corp.). Onyx Elite® 100 is an alumina trihydrate having a typical chemical analysis of $Al_2O_3$ (65%), $SiO_2$ (0.008%), $Fe_2O_3$ (0.004%), total $Na_2O$ (0.2%), soluble $Na_2O$ (0.015%), 34.6% loss on ignition (550° C.), and 0.1% free moisture (105° C.). This alumina trihydrate powder is characterized by a median particle diameter of 45 microns, a surface area of 0.75 $m^2$/gm as measured as measured with a Quantachrome monosorb surface area analyzer, and the following screen analysis: 0-10% on 100 mesh, 65% on 200 mesh, 90% on 325 mesh, 10% through 325 mesh, and 5% less than 10 microns. Yet another suitable alumina trihydrate powder is commercially available under the name Hymod® SB432 CM (J.M. Huber Corp.). Hymod® SB432 CM has a typical chemical analysis of $Al_2O_3$ (64.9%), $SiO_2$ (0.008%), $Fe_2O_3$ (0.007%), total $Na_2O$ (0.2), soluble $Na_2O$ (0.03%), 34.6% loss on ignition (550° C.), and 0.23% free moisture (105° C.). This material is characterized by a median particle diameter of 9.1 microns, a surface area of 2.15 $m^2$/gm as measured with a Quantachrome monosorb surface area analyzer and a screen analysis of 0.28% on 325 mesh and 99.7% through 325 mesh.

In some embodiments, it may be desirable to employ combinations of two or more inorganic particulate materials. For example, mixtures of inorganic particulate materials which release water of hydration at different temperatures may be employed to broaden the range of temperature at which the coating provide protection.

The invention is not limited to the use of any particular particle size of inorganic particulate material. However, it has been observed that when particulate inorganic particulate material which are water-insoluble or poorly water-soluble having relatively large particle diameters (e.g., >20 microns) are formulated into an aqueous coating system, there is a tendency for the particulate inorganic fire-retardants to separate from the aqueous phase upon lengthy periods of storage. When this occurs, the sediment must be re-suspended, often with great difficulty, before applying the coating system to a substrate. In addition, when using spray machinery to apply the coatings of the invention to a substrate, larger particle sizes of inorganic particulate materials tend to clog the nozzle. These undesirable characteristics can be overcome by employing inorganic particulate materials having a relatively small median particle diameter (e.g., <20 microns). In particular, it has been found that very small particles, on the order of about 0.1 to about 5 microns, remain suspended in aqueous solution for extended periods of time, at least several days and preferably several weeks or more, without appreciable sedimentation and provide solutions which are easily applied using conventional spray applicator equipment.

The compositions of the invention are not limited to any particular content of inorganic particulate material. In one embodiment, the aqueous coatings compositions will comprise between about 0.1% and about 50% by weight inorganic particulate material. In another embodiment, the aqueous coatings compositions will comprise between about 0.1% and about 25% by weight inorganic particulate material. In yet another embodiment, the aqueous coatings compositions will comprise between about 1% and about 10% by weight inorganic particulate material.

Of course, the level of inorganic particulate material in a dried coating will vary from the foregoing ranges due to the loss of water. In one embodiment, the dried coating will comprise between about 0.1% and about 60% by weight inorganic particulate material. In another embodiment, the dried coating compositions will comprise between about 1% and about 40% by weight inorganic particulate material. In yet another embodiment, the dried coating compositions will comprise between about 1% and about 20% by weight inorganic particulate material.

In some embodiments, the coating compositions will include an inorganic filler for increasing thermal stability and resistance of said composition to wear. As used herein, the phrase "for increasing thermal stability and resistance of said composition to wear" will be understood to mean than the inorganic filler increases the thermal stability and wear-resistance of the coating in comparison to a coating having the same components without the inorganic filler. The inorganic filler imparts stability to the coating, allowing it to withstand higher temperatures than the coating could otherwise withstand in its absence without decomposing, i.e., temperatures greater than 1,000 F and preferably greater than about 3,000 F.

There is essentially no limitation on the selection of inorganic filler. The inorganic filler may be, for example, carbonates, including without limitation calcium carbonate and chalk; metal oxides, including without limitation tin oxide, iron oxide, and titanium dioxide; clay, silica, silicates, glass powder and the like.

In one embodiment, the inorganic filler is a hydrated metal silicate clay. In the broadest aspects of the invention, any hydrated metal silicate clay may be employed. The hydrated metal silicate clay may be, for example, a clay of the Kaolinite group of the general formula $Al_2Si_2O_5(OH)_4$, including but not limited to kaolinite, dickite and nacrite; the Montmorillonite/Smectite group of the general formula $(Ca, Na, H)(Al, Mg, Fe, Zn)_2(Si, Al)_4O_{10}(OH)_2-xH_2O$, including but not limited to pyrophyllite, talc, vermiculite, sauconite, saponite, nontronite and montmorillonite; or Illite group of the general formula $(K, H)Al_2(Si, Al)_4O_{10}(OH)_2O-xH_2O$, including but not limited to illite.

In a particularly interesting embodiment, the hydrated metal silicate clay is an aluminum silicate such as, for example, kaolin ($H_2Al_2Si_2O_8 \cdot H_2O$) (CAS #1332-58-7). Suitable kaolin powders are commercially available and include, without limitation, Huber®35 (J.M. Huber Corp) which is a coarse kaolin in powder form having an average stokes equivalent particle size of 4 microns, pH between 6 and 8 in 5% water suspension, a density of 2.6 g/cm³ (20° C.), oil adsorption of about 27 g/100 g, and a decomposition temperature of about 1,799° C.; Huber® TEK-2001 (J.M. Huber Corp) which is an ultra-fine kaolin in the form of spray dried beads having an average stokes equivalent particle size of 0.25 microns, pH of about 7, density of 2.6 g/cm³ (20° C.), and an oil adsorption of 34 g/100 g; kaolin Grades 60 and 98, produced by the Burgess Pigment Company (Sandersville, Ga.), which are supplied as powders having a density of 2.6 g/cm³ (20° C.), a pH of between 3.5-7.5 in a 20% suspension in water, and a melting point above about 1,700° C. It will be understood by one skilled in the art that any such hydrated metal silicate clay may be employed.

In selecting the inorganic filler, it will be understood that hydrated metal silicate clays are not embraced by the specific embodiment of coating compositions comprising (a) a water-soluble alkali metal silicate binder; (b) at least one inorganic particulate material which endothermically releases a non-flammable gas in the presence of heat; and (c) an inorganic filler for increasing thermal stability and resistance of said composition to wear. In all other embodiments described herein, there is no limitation on the selection of inorganic filler unless otherwise specified.

In some embodiments, the coatings also comprise a polymeric binder to impart flexibility and ductility, thereby increasing the range of substrates to which the coatings may be applied. In the broadest aspect of the invention, it is contemplated that any polymeric binder may be employed, including thermoplastic and thermosetting polymers. Specific polymeric binders contemplated to be useful in the practice of the invention include without limitation polyvinyl alcohol, polyvinylidene fluoride, polyethylene oxide, polyethylene, polypropylene, polytetrafluoroethylene, polyacrylates, polyvinyl chloride, urethanes, polyesters, natural polymers such as starch, and the like. It will be appreciated that the flame-resistant and smoke-resistant properties of the coating will be enhanced by employing a polymeric binder which is itself not highly flammable, only slightly flammable, or preferably non-flammable.

In one embodiment, the polymeric binder is a water-dispersible polymer, including but not limited to latex binders. The polymeric binder may be provided, for example, as an aqueous colloidal dispersion of polymer particles having particles diameters between about 0.01 microns and about 10 microns. Within this range, polymer particles having average particle diameters between about 0.05 microns and about 1 micron are especially suitable.

With regard to the aforementioned latex binders, the skilled artisan will recognize that the term "latex" is used in its broadest sense to refer to a colloidal suspension of polymeric particles and embraces without limitation natural latex, neoprene latex, nitrile latex, acrylic latex, vinyl acrylic latex, styrene acrylic latex, styrene butadiene latex, and the like. Exemplary polymers for these latex compositions include, but are not limited to, methyl methacrylate, styrene, methacrylic acid 2-hydroxyethyl acrylate polymer (CAS # 70677-00-8), acrylic acid, methyl methacrylate, styrene, hydroxyethyl acrylate, butyl acrylate polymer (CAS # 7732-38-6), butyl acrylate, methyl methacrylate, hydroxyethyl acrylate polymer (CAS # 25951-38-6), butyl acrylate, 2-ethylhexyl acrylate, methyl methacrylate, acrylic acid polymer (CAS # 42398-14-1), styrene, butylacrylate polymer (CAS # 25767-47-9), butyl acrylate, 2-ethylhexyl acrylate, methacrylic acid polymer C (CAS # 31071-53-1), acrylic polymers, and carboxylated styrene butadiene polymers. Combinations of more than one latex binder are also contemplated to be useful in the practice of the invention.

Special mention may be made of acrylic latex binders, such as those sold by The Dow Chemical Company (Midland, Mich.) under the name UCAR™ Latex. Suitable acrylic latex binders include, but are not limited to, UCAR™ Latex 120 (an acrylic latex binder material comprising about 48% by weight of an acrylic polymer, 52% by weight water, and 0.14% by weight ammonia, having has a total solids content of 50% by weight, viscosity of about 200 cps, a bimodal particle size distribution, and a glass transition temperature, midpoint, of about −3° C.); UCAR™ Latex 9037 (an acrylic copolymer emulsion product comprising about 52% by weight butyl acrylate, methyl methacrylate, hydroxyethyl acrylate polymer (CAS # 25951-38-6), 48% by weight water, and 0.1% by weight ammonia, having a total solids content of 51.5% by weight, viscosity of about 450 cps, average particle size of about 0.3 microns, and a glass transition temperature, midpoint, of about −30° C.); UCAR™ Latex 9042 (an acrylic copolymer emulsion product comprising about 54% by weight butyl acrylate, methyl methacrylate, hydroxyethyl acrylate polymer (CAS # 25951-38-6), 45% by weight water, and 0.12% by weight ammonia having a total solids content of 55.5% by weight, viscosity of about 500 cps, average particle size of about 0.3 microns, and a glass transition temperature, midpoint, of about −35° C.); UCAR™ Latex 9043 (an acrylic copolymer emulsion product containing about 54% by weight butyl acrylate, 2-ethylhexyl acrylate, methyl methacrylate, acrylic acid polymer (CAS # 42398-14-1), 47% by weight water, 0.2% by weight ammonia, and 0.01% by weight 2-ethylhexylacrylate (CAS # 103-11-7) having a total solids content of 53% by weight, viscosity of about 175 cps, average particle size of about 0.3 microns, and a glass transition temperature, midpoint, of about −40° C.); UCAR™ Latex 9181 (an acrylic copolymer emulsion product comprising about 56% by weight butyl acrylate, 2-ethylhexyl acrylate, methyl methacrylate, acrylic acid polymer (CAS # 42398-14-1), 44% by weight water, 0.1% by weight ammonia, and 0.01% by weight 2-ethylhexylacrylate (CAS # 103-11-7) having a total solids content of 56.5% by weight, viscosity of about 450 cps, average particle size of about 0.2 microns, and a glass transition temperature, midpoint, of about −40° C.); UCAR™ Latex 9188 (an acrylic copolymer emulsion comprising about 58% by weight styrene, butylacrylate polymer (CAS # 25767-47-9) and 42% by weight water and having a total solids content of 57.3% by weight, viscosity of about 230 cps, average particle size of about 0.26 microns, and a glass transition temperature, midpoint, of about −29° C.); UCAR™ Latex 9189 (an acrylic copolymer emulsion product containing about 53% by weight butyl acrylate, methyl methacrylate, hydroxyethyl acrylate polymer (CAS # 25951-38-6), 47% by weight water, and 0.12% by weight ammonia having a total solids content of 52.5% by weight, viscosity of about 325 cps, average particle size of about 0.24 microns, and a glass transition temperature, midpoint, of about −35° C.); UCAR™ Latex 9191 (an acrylic copolymer emulsion comprising about 39% by weight butyl acrylate, methyl methacrylate, hydroxyethyl acrylate polymer (CAS # 25951-38-6), 48% by weight water, 13% by weight of an aqueous dispersion of modified rosin (CAS #8050-31-5), and 0.08% by weight ammonia and having a total solids content of 52.5% by weight, viscosity of about 250 cps, and a glass transition temperature, midpoint, of about −30° C.); UCAR™ Latex 9569 (an acrylic copolymer emulsion product containing about 58% by weight butyl acrylate, 2-ethylhexyl acrylate, methacrylic acid polymer C (CAS # 31071-53-1), 42% by weight water, 0.08% by weight 2-ethylhexyl acrylate (CAS # 103-11-7), 0.06% by weight ammonia, and 0.01% by weight 1,4-dioxane and having a total solids content of 57.5% by weight, viscosity of about 900 cps, average particle size of about 0.3 microns, and a glass transition temperature, midpoint, of about −53° C.).

Styrene acrylic latexes include, but are not limited to, UCAR™ Latex 100 (a styrene acrylic latex comprising about 62% by weight butyl acrylate, methyl methacrylate, styrene, methacrylic acid 2-hydroxyethyl acrylate polymer (CAS # 70677-00-8), 38% by weight water, and 0.04% by weight ammonia and having a total solids content of 62% by weight, viscosity of about 750 cps, average particle size of about 0.3 microns, and a glass transition temperature, midpoint, of about 12° C.) and UCAR™ Latex 462 (a styrene acrylic latex binder comprising about 45.5% by weight acrylic acid, methyl methacrylate, styrene, hydroxyethyl acrylate, butyl acrylate polymer (CAS # 7732-38-6) and about 54% by weight water and having a total solids content of 45.5% by weight, viscosity of about 400 cps, average particle size of about 0.35 microns, and a glass transition temperature, midpoint, of about 17° C.).

Styrene butadiene latexes include, but are not limited to, UCAR™ Latex DL313 (a styrene butadiene latex comprising 48% by weight of a carboxylated styrene butadiene polymer and 52% by weight water having a total solids content of 48% by weight, viscosity of about 300 cps, average particle size of about 0.1 microns, and a glass transition temperature, midpoint, of about −1° C.).

Vinyl acrylic latexes include, but are not limited to, UCAR™ Latex 162 (a vinyl acrylic copolymer latex binder comprising about 55% by weight vinyl acetate, butyl acrylate polymer (CAS # 25067-01-0), 45% by weight water, less than 0.1% by weight vinyl acetate, 0.04% by weight acetaldehyde, 0.01% by weight formaldehyde and having a total solids content of 55% by weight, viscosity of about 400 cps, average particle size of about 0.3 microns, and a glass transition temperature, midpoint, of about 12° C.) and UCAR™ Latex 357 (a vinyl acrylic copolymer latex binder comprising about 56% by weight vinyl acetate, butyl acrylate polymer (CAS # 25067-01-0), 44% by weight water, less than 0.08% by weight vinyl acetate, 0.04% by weight acetaldehyde, 0.01% by weight ammonia and having a total solids content of 56.5% by weight, viscosity of about 400 cps, average particle size of about 0.3 microns, and a glass transition temperature, midpoint, of about 23° C.).

Particular mention may be made of UCAR™ Latex 9042. The adhesive properties of UCAR™ Latex 9042 are characterized by: a 180° Peel, 30-minute dwell, pli of 3.5, a Quick Stick Adhesion, pli of 1.5, and Shear Resistance, on stainless steel, hours (½"×½×500 g) of 9.0, as tested on 2-mil polyester backing at a coat weight of 1.6-1.8 g/100 in$^2$, 73° F.

Special mention is also made of vinyl acetate/ethylene copolymers such as those sold under the trade name AIRFLEX®, manufactured by Air Products Polymers, L.P. (Allentown, Pa.). On such vinyl acetate/ethylene copolymer is AIRFLEX® EF-811 emulsion which comprises about 40% to about 60% by weight vinyl acetate/ethylene copolymer (CAS #24937-78-8) and about 40% to about 60% by weight water. AIRFLEX® EF-811 emulsion has a specific gravity of 1.07, a boiling point of 100° C., and viscosity of 600 mPas at 25° C.

The amount and type of polymeric binder may be selected to impart the desired degree of flexibility to the coating. Many polymeric binders are, by nature, soft resins. Other binders may be harder and thus not capable of producing highly flexible coatings. In this regard, it may be desirable to add a plasticizer to the coating. The use of plasticizers is, however, a strictly optional expedient. When a plasticizer is used, it may be used in any amount so as to achieve the desired flexibility. Any plasticizer may be used, including without limitation phthalates, such as dioctyl phthalate, diisononyl phthalate, diisodecyl phthalate, di(2-ethylhexyl) phthalate; vegetable oil plasticizers, including without limitation epoxidized soybean oil and esters derived from various vegetable oils; adipates such as di-(2-ehylhexyl) adipate and diisononyl adipate, plasticizers derived from adipic acid, such as those available under the trade name Palamoll® sold by BASF (Florham Park, N.J.). The plasticizer 2-ethyl hexyl diphenyl phosphate (Santicizer® 141, Ferro Corp., Cleveland, Ohio) has been found useful in the practice of the invention.

It has also been found advantageous to employ a surfactant in the compositions of the invention. For example, with the use of a surfactant it may be possible to incorporate up to 30% by weight or more of inorganic fire-retardant powders in the aqueous formulations. Surfactants are, however, strictly optional components of the inventive coatings.

Any surfactant may be employed in the practice of the invention, including ionic and nonionic surfactants. The surfactant may be, for example, an anionic surfactant, including without limitation sodium dodecylbenzene sulfate ("SDS") or the surfactant may be a nonionic surfactant, including without limitation alkyl aryl polyethoxy alcohol, octylphenol ethoxylate, and an alkyl phenoxy poly(ethyleneoxy)ethanol having alkyl groups of about 7 to about 12 carbon atoms, and the like. Particular mention may be made of the TRITON® X-100 and TRITON® CA surfactants sold by the Dow Chemical Corporation. TRITON® CA is comprised of about 40% poly(oxy-1,2-ethanediyl), alpha-(4-nonylphenyl)- omega-hydroxy-, branched (CAS# 127087-87-0), about 40% glycols, polyethylene, mono[(1,1,3,3-tetramethylbutyl)phenyl] ether (CAS #9036-19-5), about 16% poly(oxy-1,2-ethanediyl), alpha-(dinonylphenyl) (CAS# 68891-21-4), about 4% dinonylphenol, branched (CAS# 84962-08-3), and about 3% poly(ethylene oxide) (CAS #25322-68-3). TRITON® X-100 is comprised of at least 97% glycols, polyethylene, mono[(1,1,3,3-tetramethylbutyl)phenyl] ether (CAS# 9036-19-5) and less than 3% polyethylene glycol (CAS# 25322-68-3).

The surfactant will typically be present at about 0.1 to about 5% by weight based on the total weight of water in the aqueous coating suspensions. Combinations of one or more surfactants are also contemplated to be useful in the practice of the invention.

In a particularly interesting embodiment of the invention, the compositions are provided as coatings for application to flammable substrates. The coatings are provided as aqueous dispersions having the compositions of the invention dispersed substantially homogenously therein. Accordingly, laborious stirring or agitation of the liquid to re-disperse the inorganic fire-retardant is not required. The liquid coating may be packaged in cans and the like and applied to the substrate by, for example, brushing or spraying.

In some embodiments, the coatings pass the "Surface Burning Characteristics of Building Materials" standard ASTM E84-04 with a flame spread index of 0 and/or a smoke index of 0 and achieve a Class A or B rating, preferably a Class A rating. In some embodiments, the coatings also pass Fed. Std. 141B, Method 6221 for flexibility with no cracking or checking when bent 180° around a ⅛ mandrel.

The coatings may be applied to any number of substrates including, without limitation, plastic, rubber, metal, composite materials, wood, synthetic fibers, and cellulosics such as, for example cardboard. The advantages of the invention are most fully realized when the substrate is deformable, i.e., flexible, pliable, ductile, etc. Exemplary substrates therefore include, without limitation: pipes; tubes; cables; cords; ropes; wires; hoses; weld blankets; automotive parts including for example; shifter boots, "soft tops," fire walls, interior paneling, etc.; flexible panels; mats; molded plastic articles and the like. Of course, the coatings will be equally useful when applied to rigid substrates.

The coatings can be applied directly to a substrate to provide a substantially non-flammable, preferably non-flammable, and substantially smoke-free, preferably smoke free, barrier. However, the advantages of the present invention may be most fully realized when the coatings are employed in conjunction with one or more other coating materials.

ii. Coating Systems

In one variant of the invention, the coating is applied over one or more under-coatings, including for example, intumescent coatings. Accordingly, one embodiment of the invention provides a coating system comprising a coating according to the invention applied over one or more under-coatings, wherein at least one coating of the one or more under-coatings comprises an intumescent composition. Suitable intumescent compositions and coatings are well known in the art and include, for example, those disclosed in U.S. Pat. No. 5,035,951 to Dimanshteyn, the contents of which are hereby incorporated by reference herein.

Other intumescent coatings are disclosed in, for example, U.S. Pat. No. 5,759,692 to Scholz, et al., U.S. Pat. No. 5,603,990 to McGinniss, et al., U.S. Pat. No. 5,225,464 to Hill, U.S. Pat. No. 5,035,951 to Dimanshteyn, U.S. Pat. No. 4,144,385 to Downing, et al., U.S. Pat. No. 4,065,394 to Pratt et al., U.S. Pat. No. 3,955,987 to Schaar, U.S. Pat. No. 3,448,075 to Clark et al., U.S. Pat. No. 3,442,046 to Thomas et al., U.S. Pat. No. 3,021,293 to Simon, U.S. Pat. Nos. 2,755,260 and 2,684,953 to Stilbert et al., U.S. Pat. No. 2,600,455 to Wilson et al., U.S. Pat. No. 2,566,964 to Scholtz et al., U.S. Pat. No. 2,523,626 to Jones et al., U.S. Pat. No. 2,452,054 to Jones et al., U.S. Pat. No. 2,452,055 to Jones et al., the disclosures of which are hereby incorporated by reference herein.

In one embodiment, the invention provides a protective coating comprising a first coating which is capable of intumescing in the presence of heat or flame; and a second coating according to the invention, as described herein. The first coating may be any intumescent coating, including without limitation any of the intumescent coatings disclosed in the patents listed above, and in particular U.S. Pat. No. 5,035,951 to Dimanshteyn. The first coating may be applied directly to the substrate or may be disposed on one or more undercoatings, one of which is in intimate contact with the substrate. The second coating is a coating according to the present invention comprising: (i) a water-soluble alkali metal silicate binder; (ii) an inorganic particulate material which endothermically releases non-flammable gas in the presence of heat; (iii) an inorganic filler for imparting increased thermal stability and wear-resistance to the coating; and (iv) a polymeric binder. The second coating is disposed either directly on the first coating or on one or more coatings intermediately disposed between the first and second coatings. In one interesting embodiment, the first coating is applied directly on a flammable substrate and the second coating is disposed on the first coating. The first coating, such as an intumescent coating, will typically, although not necessarily, be about 10-50 Mil in thickness and the second coating, i.e., the coating according to the invention, will typically, although not necessarily, be about 5-40 Mil in thickness.

The inventive coatings may be employed as one layer in a multi-layer coating "system," which includes, for example, one or more under-coatings, including without limitation an intumescent coating, and/or one or more over-coatings, including, for example, a fire-retardant coating that is substantially resistant to water. One embodiment of such a coating system will comprise a first, second, and third coating. The first coating may be one which is capable of intumescing in the presence of heat or flame such as, for example, any of those disclosed in U.S. Pat. No. 5,035,951. The first coating is typically applied directly to the substrate or may alternatively be disposed on one or more undercoatings, one of which is in intimate contact with the substrate. The second coating is a substantially non-flammable and substantially smoke-free coating according to the invention comprising: (i) a water-soluble alkali metal silicate binder; (ii) an inorganic particulate material which endothermically releases non-flammable gas in the presence of heat; (iii) an inorganic filler for imparting increased thermal stability and wear-resistance to the coating; and (iv) a polymeric binder. The second coating may be disposed either directly on the first coating or on one or more coatings intermediately disposed between the first and second coatings. In one useful embodiment, the second coating is disposed directly on the first coating which is an intumescent coating. The third coating is typically a fire-retardant coating. In some implementations, the third coating will be substantially resistant to water, and may, for example, comprise a water-insoluble polymeric binder and an inorganic fire-retardant. The third coating may suitably be, without limitation, any coating disclosed in commonly owned U.S. patent application Ser. No. 11/212,319, filed Aug. 25, 2005, entitled "Flexible Protective Coating," the contents of which are hereby incorporated by reference herein. The third coating is disposed either directly on the second coating or on one or more coatings intermediately disposed between the second and third coatings. In one implementation, the third coating is disposed directly on the second coating. The first coating will typically, although not necessarily, be about 10-50 Mil in thickness, the second coating, i.e., the coating according to the invention, will typically, although not necessarily, be about 5-40 Mil in thickness, and the third coating will typically, although not necessarily, be about 5-40 Mil in thickness.

When the third coating is a water-resistant coating, such as those disclosed in U.S. patent application Ser. No. 11/212,319, incorporated by reference herein, the coating systems are particularly suitable for application to substrates which are subjected to water from condensation, outdoor use, high humidity environments, etc., including, for example, various HVAC components.

iii. Paints

In another embodiment of the invention, substantially non-flammable and substantially smoke-free paints are provided. The paints according to the invention comprise (a) a water-soluble alkali metal silicate binder; (b) at least one inorganic particulate material which endothermically releases a nonflammable gas in the presence of heat; (c) a polymeric binder; and (d) one or more coloring agents, such as pigments. The polymeric binder may be any suitable elastomer, including for example, the latex binders described herein. The paints may optionally comprise an inorganic filler for increasing thermal stability and resistance to wear, including for example, a hydrated metal silicate clay such as kaolin. The description of water-soluble alkali metal silicate binders, inorganic particulate material which endothermically release a nonflammable gas in the presence of heat, polymeric binders, and inorganic fillers described above is equally applicable to the inventive paints.

Advantageously, the latex paints according to the invention will have a substantially lower content of petroleum-derived materials than conventional latex paint. It is possible to formulate latex paints according to the invention to pass ASTM E84 Tunnel Test with a flame spread index of 0 and/or a smoke index or 0.

Typically, the latex paints will comprise one or more opacifying or "hiding" pigments, including without limitation, rutile and anatase titanium dioxides, lithopone, zinc sulfide, lead titanate, antimony oxide, zirconium oxide, titanium calcium, white lead, titanium barium, zinc oxide, leaded zinc oxide, and the like. Particular mention may be made of titanium dioxide as an opacifying pigment. The opacifying pigment will typically, although not necessarily, comprise between about 1% and about 20% by weight of the dry paint. In some embodiments, the opacifying pigment will have a weight average particle size between about 0.2 to 0.4 microns.

The latex paints may further comprise one or more colored pigments for providing the desired hue to the paint. The colored pigment may be either organic or inorganic. Suitable colored pigments include, without limitation, ferrite yellow oxide, ferric oxide, brown or tan oxide of iron, raw sienna, raw and burnt umber, chromium oxide green, ultramarine blue, carbon black, lampblack, toluidine red, cadmium reds and yellows, duratone red, chrome yellow, and the like. It is within the ordinary skill in the art to choose colored pigments and combinations thereof to achieve any desired hue. When present, the colored pigments will typically comprise between about 1% to about 10% by weight of the dry paint.

The latex paints may optionally comprise one or more extender or inert pigments, including for example, calcium carbonate, talc, clay and the like, for adjusting the thickness, gloss and durability of the paint.

The inventive latex paints may be formulated as gloss, semi-gloss, satin, eggshell, or flat paints, as defined by ASTM Test Method D523 "Standard Test Method for Specular Gloss," depending on the amount of total pigment employed, as is well known in the art.

The latex paints will typically employ water as a volatile vehicle but may also comprise other materials such as glycols to keep the paint liquid and uniform prior to drying. Thickeners may also be added to enhance the rheological properties of the paint. Suitable thickeners include, without limitation, hydroxyethylcellulose (HEC), hydrophobically modified HEC (HMHEC), hydrophobically modified alkali-soluble emulsions (HASEs), and nonionic synthetic associative thickeners (NSATs). Non-cellulosic thickeners, such as polyacrylic acids and activated attapulgite, are also contemplated to be suitable. Other conventional latex paint additives may also be added, including but not limited to freeze-thaw stabilizers, coalescing agents, bacteriocides and fungicides, defoamers, and pigment dispersants.

The latex paints may be prepared according to conventional practice. Typically, a "grind" is prepared by vigorous mixing of the pigment with other components to break up agglomerated pigments and provide a homogenous viscous dispersion. While not strictly necessary, it has been found desirable to include the hydrated metal silicate clay, when present, with the components of the grind. The remaining components, commonly referred to in the art as the "letdown," are then added to the grind and mixed to form the final paint formulation. The polymeric binder may be partitioned between the grind and the letdown, but is preferably added with the letdown.

EXAMPLE 1

A coating composition according to the invention is provided as an aqueous dispersion having the formulation of Table 1.

TABLE 1

| Component | parts by weight |
| --- | --- |
| Sodium Silicate (N ®, PQ Corp.) | 241 |
| Alumina Trihydrate (Micral ® 932, J. M. Huber) | 105 |
| Kaolin (TEK-2001, J. M. Huber) | 25 |
| Surfactant (Triton ® CA, Dow) | 10 |
| Water | 5 |

The aqueous coating composition of Table 1 has the form of a substantially homogeneous dispersion in water. The viscosity of the formulation can be adjusted as desired by the addition of water. The N® sodium silicate (PQ Corp.) used in the aqueous formulation contains about 62.5% water and has a sodium silicate content of about 37.5% by weight. The 241 parts by weight sodium silicate listed in Table 1 refers to the total weight of N® sodium silicate (PQ Corp.) solution. If a viscous formulation is desired, the 5 parts additional water may be decreased or omitted.

The coating composition can be packaged in cans and the like and applied to a substrate by, for example, brushing or spraying, all according to conventional practice. The coating dries quickly, typically, within one hour and even in 30 minutes or less, by the evaporation of water. The dried coating will comprise about 40% sodium silicate (solids), 46% alumina trihydrate, 11% kaolin, and less than 5% surfactant based on the weight of the coating.

EXAMPLE 2

Two coating composition according to the invention are provided as aqueous dispersions having the formulations shown in Table 2.

TABLE 2

| Component | Formula A parts by weight | Formula B parts by weight |
|---|---|---|
| Sodium Silicate (N ®, PQ Corp.) | 241 | 210 |
| Alumina Trihydrate (Micral ® 932, J. M. Huber) | 105 | 21 |
| Kaolin (Grade 601, J. M. Huber) | 25 | 80 |
| Water | 5 | 10 |

The aqueous coating compositions of Table 2 have the form of a substantially homogenous dispersions in water. The viscosity of the formulations can be adjusted as desired by the addition of water. If a viscous formulation is desired, the 5 parts additional water may be decreased or omitted. The N® sodium silicate (PQ Corp.) used in the aqueous formulations contains about 62.5% water and has a sodium silicate content of about 37.5% by weight. The parts by weight sodium silicate listed in Table 2 refers to the total weight of N® sodium silicate (PQ Corp.) solution.

The dried coating of Formula A will comprise about 41% sodium silicate (solids), 48% alumina trihydrate, and 11% kaolin based on the weight of the coating. The dried coating of Formula B will comprise about 44% sodium silicate (solids), 12% alumina trihydrate, and 44% kaolin based on the weight of the coating.

EXAMPLE 3

Two coating compositions according to the invention are provided as aqueous dispersions having the formulation of Table 3.

TABLE 3

| Component | Formula A parts by weight | Formula B parts by weight |
|---|---|---|
| Sodium Silicate (N ®, PQ Corp.) | 210 | 600 |
| Alumina Trihydrate (Micral ® 932, J. M. Huber) | 5.8 | 12 |
| Kaolin (TEK-2001, J. M. Huber) | 55.65 | 192 |
| Polymeric binder (UCAR ™ Latex 9042, Dow) | 46.2 | 165 |
| Plasticizer (Santicizer ® 141) | 6.1 | — |
| Surfactant (Triton ® CA, Dow) | .53 | 2 |
| Water | 10 | — |

The aqueous coating compositions of Table 3 has the form of substantially homogenous dispersions in water. The viscosity of the formulations can be adjusted as desired by the addition of water. If a viscous formulation is desired, the 10 parts additional water may be decreased or omitted. The N® sodium silicate (PQ Corp.) used in the aqueous formulation contains about 62.5% water and has a sodium silicate content of about 37.5% and the UCAR™ Latex 9042 contains about 45% water and about 55% solid by weight. The parts by weight sodium silicate listed in Table 2 refers to the total weight of N® sodium silicate (PQ Corp.) solution and the parts by weight polymeric binder refers to the total weight of UCAR™ Latex 9042 dispersion.

The dried coating of Formula A will comprise about 46% sodium silicate (solids), 3.4% alumina trihydrate, 32% kaolin, 14.5% polymeric binder (solids), 3.6% plasticizer, and 0.3% surfactant based on the weight of the coating. The dried coating of Formula B will comprise about 43.1% sodium silicate (solids), 2.3% alumina trihydrate, 36.7% kaolin, 17.4% polymeric binder (solids), and 0.4% surfactant based on the weight of the coating.

EXAMPLE 4

Test were conducted to evaluate the ability of the coating of Example 3, Formula A to enhance the performance characteristics of an underlying intumescent coating. A polyethylene panel was coated with a 15 Mil coating of the intumescent coating described in U.S. Pat. No. 5,035,951, incorporated by reference herein. A 10 Mil coating according to Example 3, formula A was applied on top of the intumescent coating. The coated polyethylene panels were subjected to surface burning testing according to the "Surface Burning Characteristics of Building Materials" standard ASTM E84-04. See *ASTM Fire Standards*, Sixth Edition, ASTM International, Oct. 1, 2004 and *Annual Book of ASTM Standards*, Volume 04.07, Nov. 2004, the contents of which are hereby incorporated by reference in their entirety.

ASTM E84-04 compares surface flame spread and smoke development measurements to those obtained from tests of mineral fiber cement board and select grade red oak flooring standards. The sample is subjected to flame for ten minutes while flame front advance and smoke density measurements are recorded. The flame reached a temperature of 482° F. The results of the tests are summarized in Table 4.

TABLE 4

| Parameter | Index |
|---|---|
| Flame Spread Index | 0 |
| Smoke Index | 5 |

Based on the foregoing test, the coated polyethylene panel is considered a "Class A" building material per ASTM E84-04.

EXAMPLE 5

A latex paint according to the invention is provided as aqueous dispersions having the formulation of Table 5.

TABLE 5

| Component | parts by weight |
|---|---|
| Sodium Silicate (N ®, PQ Corp.) | 5.5 lbs |
| Alumina Trihydrate (Micral ® 932, J. M. Huber) | 2.0 lbs |
| Kaolin (Grade 601, J. M. Huber) | 0.2 lbs |
| Polymeric binder (UCAR ™ Latex 9042, Dow) | 2.1 lbs |
| Polymeric binder (UCAR ™ DL 313, Dow) | 0.5 lbs |
| Defoamer | 0.25 oz |

TABLE 5-continued

| Component | parts by weight |
|---|---|
| Titanium Dioxide | 2.0 lbs |
| Water | 1.5 lbs |

Cement boards were coated with a 0.007 inch coating of the composition shown in Table 6 and allowed to dry. The coated boards were subjected to surface burning testing according to the "Surface Burning Characteristics of Building Materials" standard ASTM E84-04. The sample was subjected to flame for ten minutes while flame front advance and smoke density measurements were recorded. The results of the tests are summarized in Table 6.

TABLE 6

| Parameter | Index |
|---|---|
| Flame Spread Index | 0 |
| Smoke Index | 0 |

Based on the foregoing test, the coated cement board is considered a "Class A" building material per ASTM E84-04.

EXAMPLE 6

Figure 1:
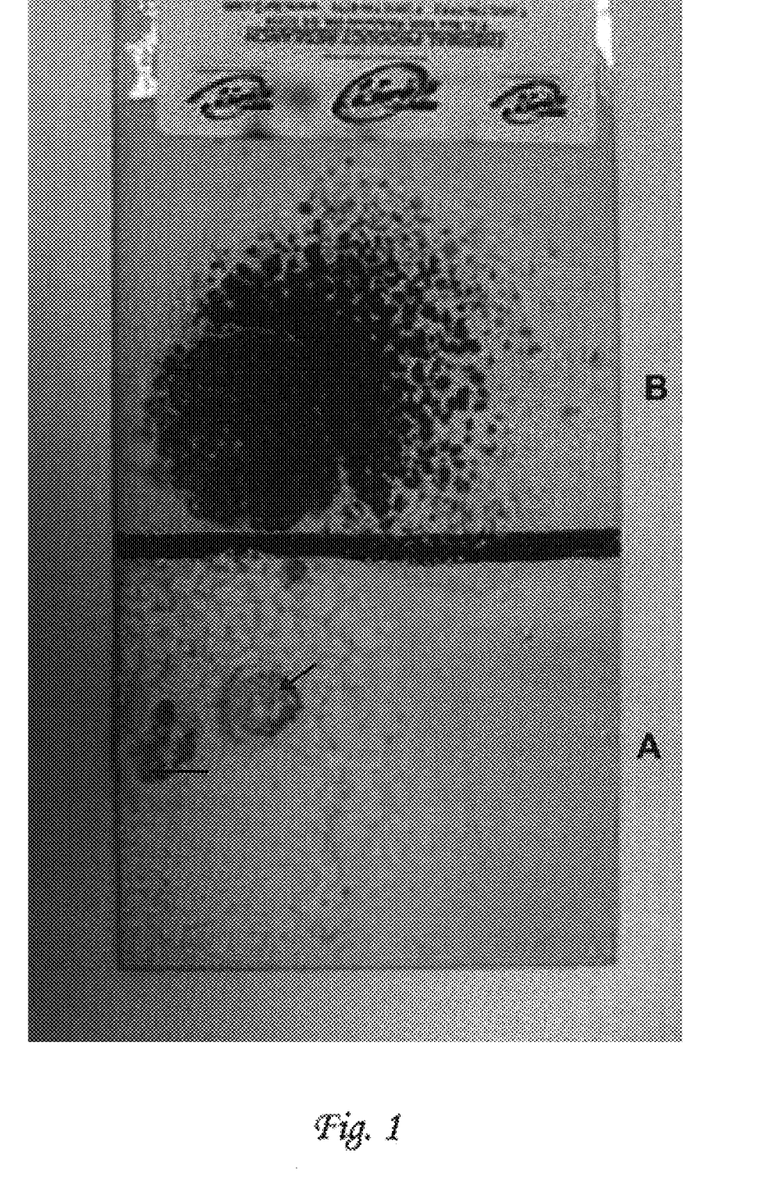
FIG. 1 shows a panel treated on one half (A) with an intumescent coating and on the other half (B) with the heat-shedding coating of the invention after equivalent exposure to flame from a torch.

The surface of a rectangular steel panel was coated with a 15 Mil thick coating of the intumescent coating described in U.S. Pat. No. 5,035,951. Half of the treated surface of the panel was further treated with a 10 Mil coating according to Example 3, Formula A disposed directly on the intumescent coating. Thereby, half of the panel was coated with only an intumescent coating (first area) whereas the other half was coated with the inventive coatings on top of the intumescent coating (second area). The first and second areas were subjected to the flame of a methylacetylene-propandiene (MAPP) torch held a distance of two inches from the surface for 30 seconds. The results are shown in FIG. 1. The first area A produced a soft char which could be easily crushed with moderate hand-pressure. Many large bubbles were formed including two very large bubbles which ruptured to expose the underlying substrate (indicated by arrows in FIG. 1). In contrast, the char produced in the second area B was hard an glassy and could not be crushed. There was no evidence of exposed substrate in area B.

It will be understood that the recitation of ranges contained herein are as a matter of convenience only and the inventors are in possession of every value intermediate within the ranges. That is, every intermediate value or sub-range within a disclosed range should be understood to be inherently disclosed. Additionally, it is understood that the composition may include other additives, including pigments, emulsifiers, defoamers, or other such elements that the user may wish to add.

It should thus be understood that this description (including the tables) is only representative of some illustrative example variants. For the convenience of the reader, the above description has focused on a representative sample of all possible permutations and combinations, a sample that teaches the principles of the invention. The description has not attempted to exhaustively enumerate all possible variations, permutations or combinations. That all such variants, permutations or combinations have not been presented or may be available is not to be considered a disclaimer of those variants, permutations or combinations. One of ordinary skill will appreciate that many of those variants, permutations or combinations incorporate the very same principles and can be achieved without undue effort, although in some cases they are literally described herein and in other cases, although not specifically described, are equivalent.

The invention claimed is:

1. A coating composition consisting essentially of:
    (a) about 30 to about 65% by weight of a water-soluble alkali metal silicate binder;
    (b) about 0.1 to about 50% by weight of at least one inorganic particulate material which endothermically releases a nonflammable gas in the presence of heat;
    (c) about 0.1 to about 25% by weight of an inorganic filler for increasing the thermal stability and resistance of said composition to wear, as compared to a composition comprising (a), (b), and (d) in the absence of said inorganic filler;
    (d) about 1 to about 25% by weight of a polymeric binder; and
    (e) not more than about 1% by weight of a surfactant.

2. The composition of claim 1 wherein said alkali metal silicate binder is a sodium silicate.

3. The composition of claim 1 wherein said inorganic particulate material is an oxide comprising water of hydration.

4. The composition of claim 3 wherein said inorganic particulate material is alumina trihydrate.

5. The composition of claim 1 wherein said inorganic particulate material has a median particle diameter of between about 0.1 and about 5 microns.

6. The composition of claim 1 wherein said inorganic filler is a hydrated metal silicate clay.

7. The composition of claim 6 wherein said hydrated metal silicate clay is kaolin.

8. The composition of claim 1 wherein said polymeric binder is a thermoplastic polymer.

9. The composition of claim 1 wherein said polymeric binder is a thermosetting polymer.

10. The composition of claim 1 wherein said polymeric binder is a latex.

11. The composition of claim 10 wherein said latex is selected from the group consisting of acrylic latexes, vinyl acrylic latexes, styrene acrylic latexes, styrene butadiene latexes, and combinations thereof.

12. A substantially non-flammable coating comprising the composition of claim 1.

13. A coating having a Flame Spread Index of 0 as measured by ASTM E84-04 comprising the composition of claim 1.

14. A coating having a Smoke Index of 0 as measured by ASTM E84-04 comprising the composition of claim 1.

15. A fire-protected material comprising a flammable substrate having applied thereto the coating of claim 1.

16. A coating composition consisting essentially of:
    (a) about 30 to about 65% by weight of a water-soluble sodium silicate;
    (b) about 0.1 to about 50% by weight of alumina trihydrate;
    (c) about 0.1 to about 25% by weight of kaolin;
    (d) about 1 to about 25% by weight of a latex polymeric binder; and
    (e) not more than about 1% by weight of a surfactant.

17. A coating system comprising:
    (a) a first coating, said first coating being capable of intumescing in the presence of heat or flame; and
    (b) a second coating, said second coating comprising:
        (i) about 30 to about 65% by weight of a water-soluble alkali metal silicate binder;

(ii) about 0.1 to about 50% by weight of at least one inorganic particulate material which endothermically releases a nonflammable gas in the presence of heat;

(iii) about 0.1 to about 25% by weight of an inorganic filler for increasing thermal stability and resistance of said composition to wear, as compared to a composition comprising (i), (ii), and (iv) in the absence of said inorganic filler;

(iv) about 1 to about 25% by weight of a polymeric binder; and (v) not more than about 1% by weight of a surfactant;

said second coating being disposed either directly on said first coating or on one or more coatings intermediately disposed between said first and second coatings.

18. The coating system of claim 17 wherein said first coating comprises:

(a) a water-soluble alkali metal silicate binder;

(b) at least one inorganic particulate material which endothermically releases a nonflammable gas in the presence of heat; and (c) an inorganic filler for increasing thermal stability and resistance of said composition to wear, as compared to a composition comprising (a) and (b) in the absence of said inorganic filler.

19. A coating comprising:

(a) a first coating, said first coating being capable of intumescing in the presence of heat or flame; and (b) a second coating comprising:

(i) about 30 to about 65% by weight of a water-soluble alkali metal silicate binder;

(ii) about 0.1 to about 50% by weight of at least one inorganic particulate material which endothermically releases a nonflammable gas in the presence of heat;

(iii) about 0.1 to about 25% by weight of an inorganic filler for increasing thermal stability and resistance of said composition to wear, as compared to a composition comprising (i), (ii), and (iv) in the absence of said inorganic filler;

(iv) about 1 to about 25% by weight of a polymeric binder; and (v) not more than about 1% by weight of a surfactant;

(c) a third coating, said third coating being resistant to water, said third coating comprising a water-insoluble polymeric binder and an inorganic fire-retardant;

wherein, said second coating is disposed either directly on said first coating or on one or more coatings intermediately disposed between said first and second coatings and wherein said third coating is disposed either directly on said second coating or on one or more coatings intermediately disposed between said second and third coatings.

20. The coating system of claim 19 wherein said first coating comprises:

(a) a water-soluble alkali metal silicate binder;

(b) at least one inorganic particulate material which endothermically releases a nonflammable gas in the presence of heat; and (c) an inorganic filler for increasing thermal stability and resistance of said composition to wear, as compared to a composition comprising (a) and (b) in the absence of said inorganic filler.

21. A coating composition consisting essentially of:

(a) about 30 to about 65% by weight of a water-soluble alkali metal silicate binder;

(b) about 0.1 to about 50% by weight of at least one inorganic particulate material which endothermically releases a nonflammable gas in the presence of heat;

(c) about 1 to about 25% by weight of a polymeric binder; and (d) not more than about 1% by weight of a surfactant.

22. A coating composition consisting essentially of:

(a) about 30 to about 65% by weight of a water-soluble alkali metal silicate binder;

(b) about 0.1 to about 50% by weight of at least one inorganic particulate material which endothermically releases a nonflammable gas in the presence of heat;

(c) about 0.1 to about 25% by weight of an inorganic filler for increasing thermal stability and resistance of said composition to wear, as compared to a composition comprising (a) and (b) in the absence of said inorganic filler;

with the proviso that the inorganic filler is not a hydrated metal silicate clay, and (d) not more than about 1% by weight of a surfactant.

23. A latex paint comprising:

(a) about 30 to about 65% by weight of a water-soluble alkali metal silicate binder;

(b) about 0.1 to about 50% by weight of at least one inorganic particulate material which endothermically releases a nonflammable gas in the presence of heat;

(c) about 1 to about 25% by weight of a polymeric binder;

(d) one or more pigments; and (e) not more than about 1% by weight of a surfactant.

24. The latex paint of claim 23 having a Flame Spread Index of 0 as measured by ASTM E84-04.

25. The latex paint of claim 23 having a Smoke Index of 0 as measured by ASTM E84-04.

* * * * *